United States Patent
Tseng et al.

(10) Patent No.: US 10,248,225 B1
(45) Date of Patent: Apr. 2, 2019

(54) MOUSE DEVICE

(71) Applicant: CHENG UEI PRECISION INDUSTRY CO., LTD., New Taipei (TW)

(72) Inventors: Chi Ming Tseng, New Taipei (TW); Yu Hsiang Ting, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/883,606

(22) Filed: Jan. 30, 2018

(51) Int. Cl.
*G06F 3/0354* (2013.01)
*H01H 13/86* (2006.01)
*G06F 3/02* (2006.01)

(52) U.S. Cl.
CPC ........ *G06F 3/03543* (2013.01); *G06F 3/0202* (2013.01); *H01H 13/86* (2013.01)

(58) Field of Classification Search
CPC ...... G06F 1/3259; G06F 3/0312; G06F 3/033; G06F 3/0317; G06F 3/0346; G06F 3/0354; G06F 3/03541; G06F 3/03543; G06F 3/0487; G06F 2203/0332; G06F 2203/0334; G06F 2203/0333
See application file for complete search history.

(56) References Cited

U.S. PATENT DOCUMENTS

| | | | | |
|---|---|---|---|---|
| 10,095,321 | B1* | 10/2018 | Lu | G06F 3/03543 |
| 2002/0135559 | A1* | 9/2002 | Hou | G06F 3/03543 |
| | | | | 345/156 |
| 2003/0025673 | A1* | 2/2003 | Ledbetter | G06F 3/0213 |
| | | | | 345/163 |
| 2017/0300137 | A1* | 10/2017 | Chen | G06F 3/03543 |

* cited by examiner

*Primary Examiner* — Premal R Patel
(74) *Attorney, Agent, or Firm* — WPAT, PC

(57) ABSTRACT

A mouse device includes a shell including a top shell, a circuit board, at least one electrical switch electrically equipped on the circuit board, a key holder disposed to the shell, and at least one elastic element. The key holder includes at least one key corresponding to the at least one electrical switch. The at least one key has a touch element. The at least one key is capable of selectively triggering the at least one electrical switch by virtue of the touch element moving downward to contact and moving upward to break away from the at least one electrical switch. The at least one elastic element is fastened to a rear end of the at least one key. The elastic element elastically abuts against at least one of the top shell and the at least one key.

20 Claims, 12 Drawing Sheets

MOUSE DEVICE

BACKGROUND OF THE INVENTION

1. Field of the Invention

The present invention generally relates to a mouse device, and more particularly to a mouse device capable of reinforcing a resilience sensitivity of a key holder of the mouse device.

2. The Related Art

A conventional mouse device is a common peripheral input device of a computer system, characteristics of the conventional mouse device are described as follows. A moving track of a user holding the conventional mouse device is corresponding to a cursor of an operation window of the computer system, orders in a command list of the operation window of the computer system are selected or executed by virtue of clicking a key holder of the conventional mouse device, so the conventional mouse device plays an important role in processing documents, browsing web pages, playing games or operating professional softwares.

When the key holder of the conventional mouse device is pressed downward, a resilience mechanism of the key holder of the conventional mouse device exerts a resilience force on the key holder of the conventional mouse device by virtue of an elastic piece in an electrical switch corresponding to a bottom of the key holder of the conventional mouse device; when the user releases the key holder, the key holder is able to return to an original position by virtue of relying on the resilience force of the elastic piece, so that the key holder of the conventional mouse device is able to complete a pressing operation.

However, with the boom in recent video games and sports games and with the rise of competitive games, when players proceed playing the competitive games, the players tend to pursue better operation behaviors. Furthermore, because the conventional mouse device acts essential parts, including character movements, attacks, selections and so on of the competitive games in the process of playing the competitive games, the key holder of the conventional mouse device generally needs to be clicked largely and quickly in such operations of the character movements, the attacks and the selections and so on for reaching anticipated operations of the players. Thus a resilience sensitivity of the key holder of the conventional mouse device will directly feed practical operation results that will affect a hand feeling of the user.

Thus, in order to solve the problems described above, an innovative mouse device need be provided, a user is capable of having a quicker operation sensitivity by virtue of increasing a resilience sensitivity of a key holder of the innovative mouse device for satisfying operation requests of the user.

SUMMARY OF THE INVENTION

An object of the present invention is to provide a mouse device. The mouse device includes a shell including a top shell, a circuit board for outputting electrical signals assembled in the shell, at least one electrical switch electrically equipped on the circuit board, a key holder disposed to the shell, and at least one elastic element. The key holder includes at least one key corresponding to the at least one electrical switch. The at least one key has a touch element disposed to a front end of the at least one key. The touch element is corresponding to the at least one electrical switch. The at least one key is capable of selectively triggering the at least one electrical switch by virtue of the touch element moving downward to contact and moving upward to break away from the at least one electrical switch. The at least one elastic element is fastened to a rear end of the at least one key of the key holder and located to the top shell of the shell. The elastic element elastically abuts against at least one of the top shell of the shell and the at least one key, after the touch element of the at least one key of the key holder is pressed downward towards the at least one electrical switch of the circuit board, the at least one elastic element is capable of increasing needed resilience force of the at least one key of the key holder for making the touch element of the at least one key of the key holder rebound to an original position.

Another object of the present invention is to provide a mouse device. The mouse device includes a shell, a circuit board, at least one electrical switch, a key holder and at least one elastic element. The shell includes a main shell, and a rear cover covered to a rear end of the main shell. A top of the shell opens at least one opening communicated with an inside of the shell. The circuit board is assembled in the inside of the shell. The circuit board is defined as a main part for outputting electrical signals of the mouse device. The at least one electrical switch is electrically equipped on the circuit board and is corresponding to the at least one opening of the shell. The key holder is disposed to the shell and disposed between the main shell and the rear cover of the shell. The key holder includes at least one key. The at least one key has a touch element. A bottom surface of the touch element protrudes downward towards the circuit board to form at least one knocking portion corresponding to the at least one electrical switch. The at least one key is capable of selectively triggering the at least one electrical switch by virtue of the at least one knocking portion moving downward to contact and moving upward to break away from the at least one electrical switch through the at least one opening. The at least one elastic element is fastened to a rear end of the at least one key of the key holder. The at least one elastic element is elastically limited between the rear cover and the main shell, and the at least one elastic element abuts against at least one of the main shell, the rear cover and the at least one key, after the touch element of the at least one key of the key holder is pressed downward towards the circuit board, the at least one elastic element is capable of increasing needed resilience force of the at least one key of the key holder for making the touch element of the at least one key of the key holder rebound to an original position.

As described above, when the key holder rebounds, the at least one elastic element disposed to the mouse device increases the needed resilience force of the key holder, so needed time of the key holder rebounding is decreased for making the key holder rebound to the original position more quickly. As a result, the mouse device is capable of reinforcing a resilience sensitivity of the key holder of the mouse device.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
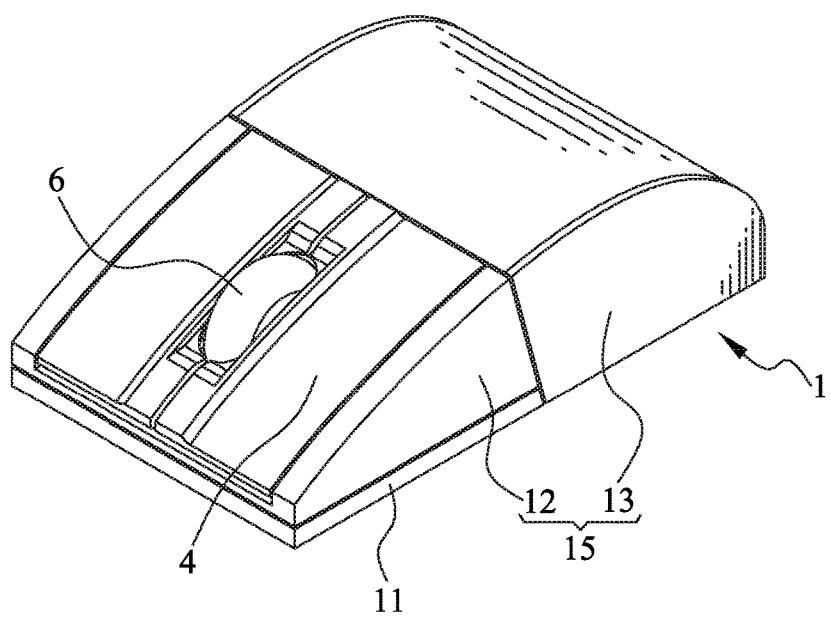
FIG. 1 is a perspective view of a mouse device in accordance with a first preferred embodiment of the present invention.
Figure 2:
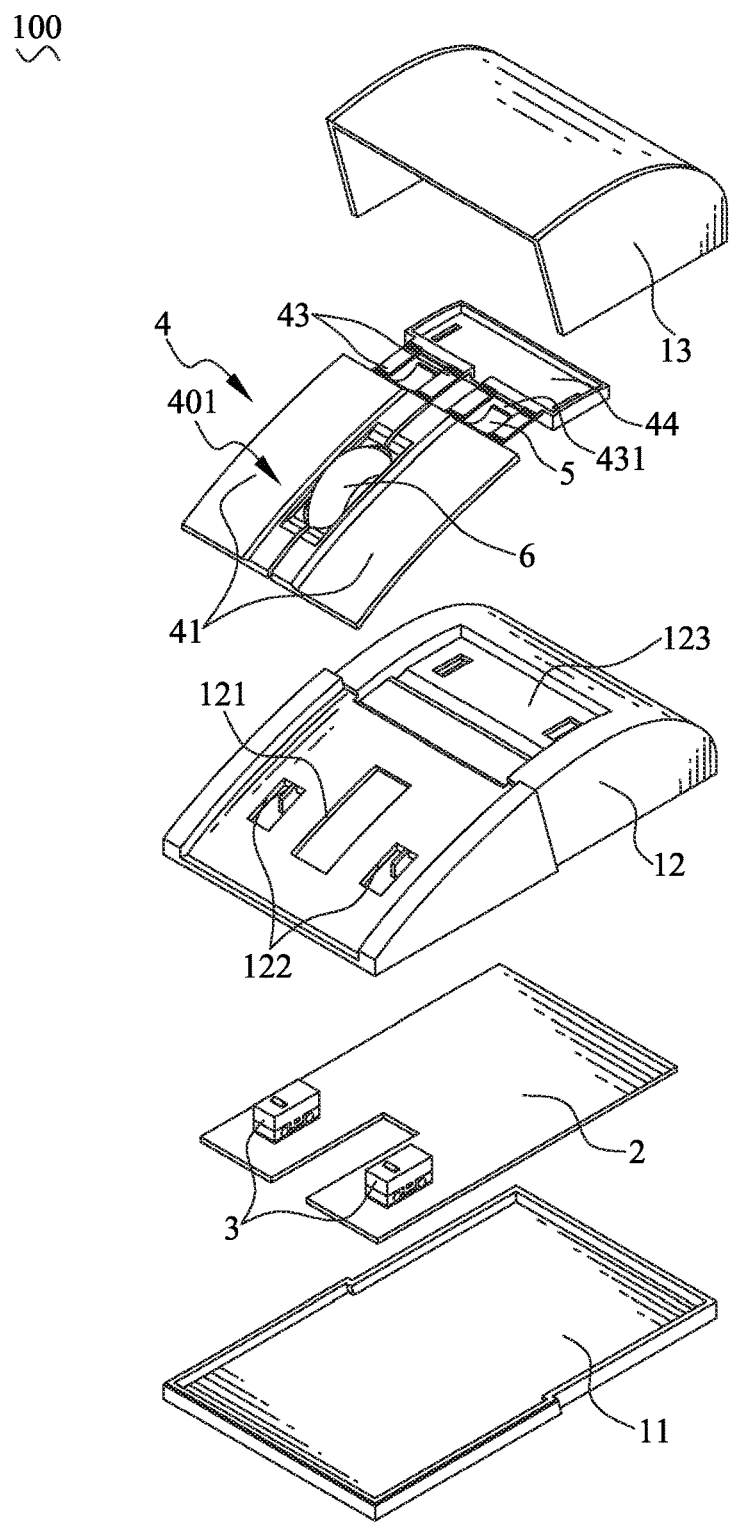
FIG. 2 is an exploded perspective view of the mouse device of FIG. 1.
Figure 3:
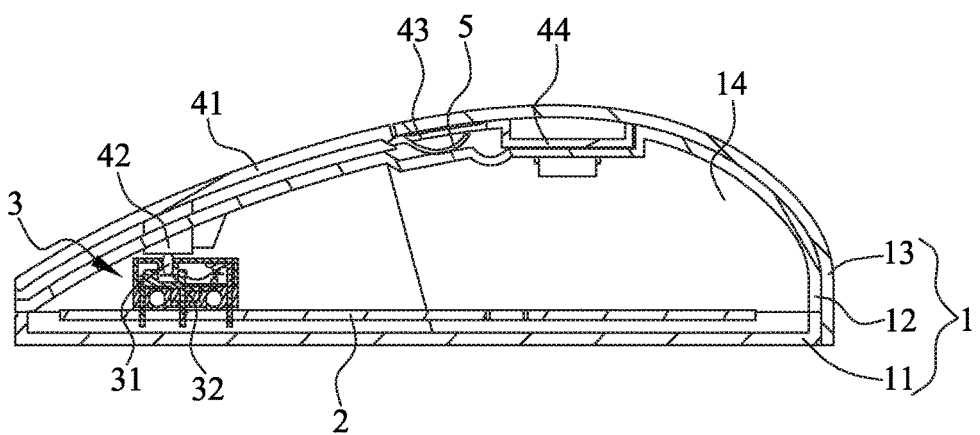
FIG. 3 is a sectional view of the mouse device of FIG. 1.
Figure 4:
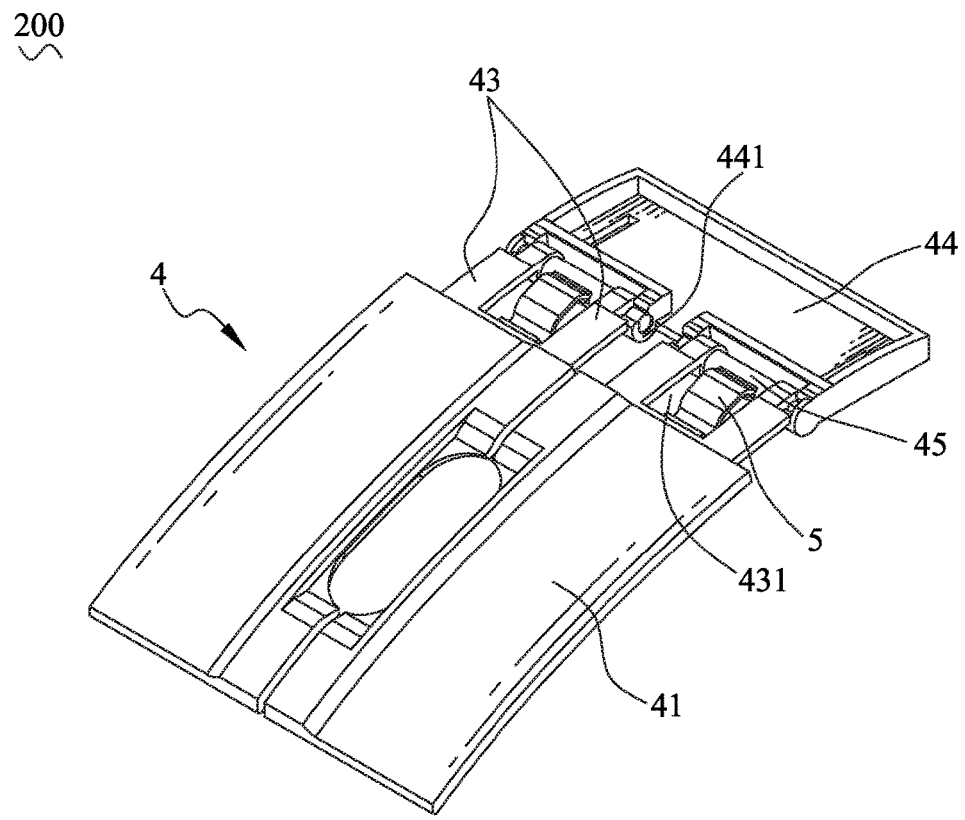
FIG. 4 is a perspective view of a key holder of a mouse device in accordance with a second preferred embodiment of the present invention.
Figure 5:
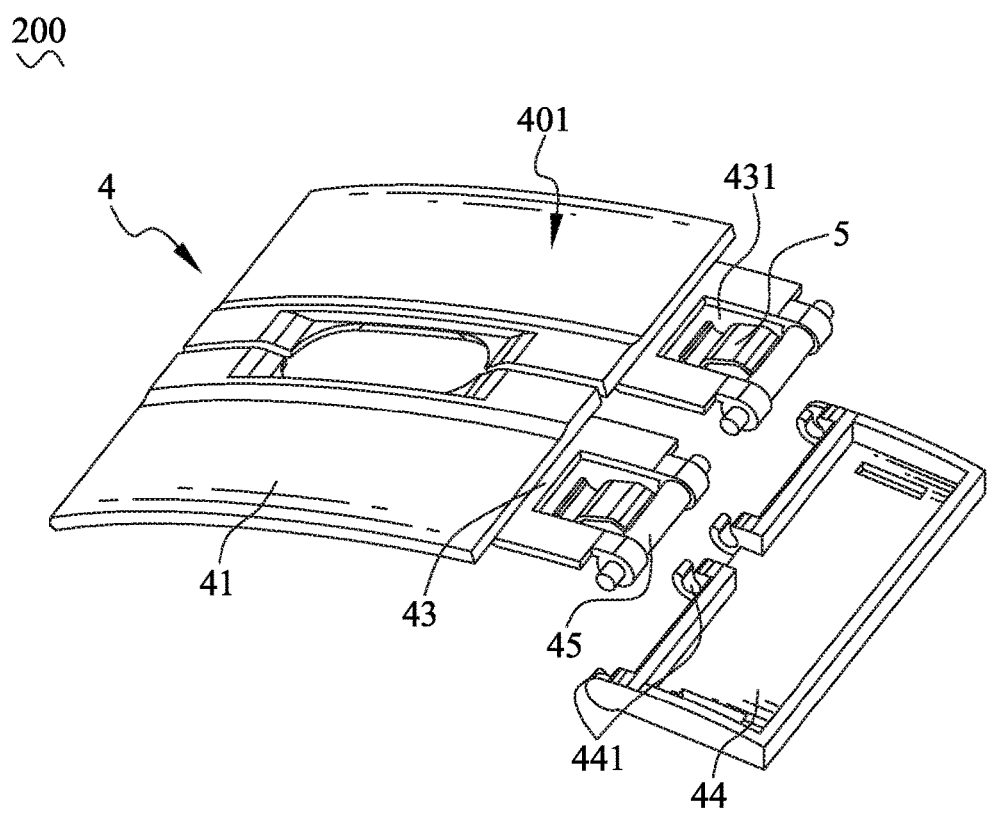
FIG. 5 is an exploded perspective view of the key holder of the mouse device of FIG. 4.
Figure 6:
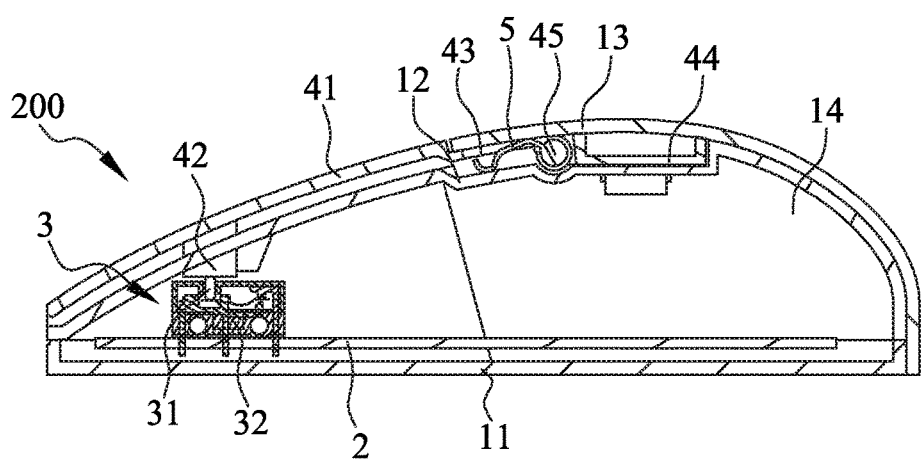
FIG. 6 is a sectional view of the mouse device in accordance with the second preferred embodiment of the present invention.
Figure 7:
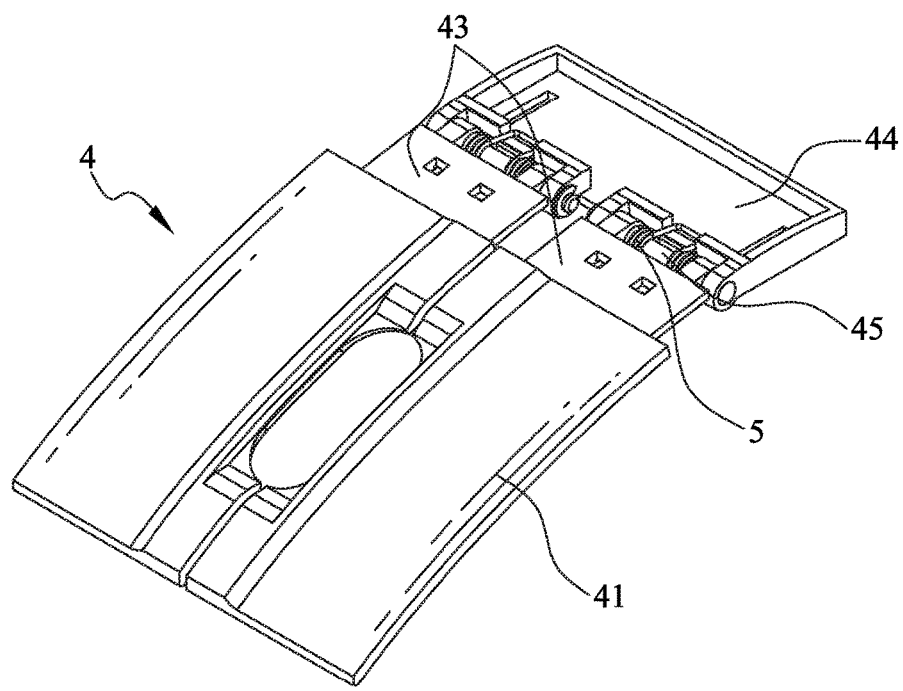
FIG. 7 is a perspective view of a key holder of a mouse device in accordance with a third preferred embodiment of the present invention.
Figure 8:
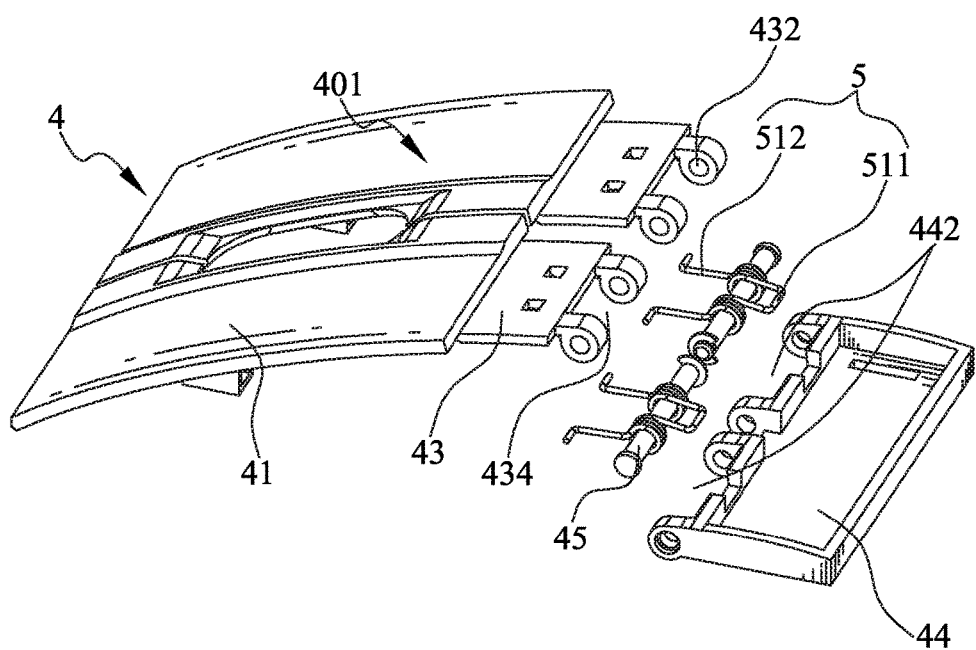
FIG. 8 is an exploded perspective view of the key holder of the mouse device of FIG. 7.
Figure 9:
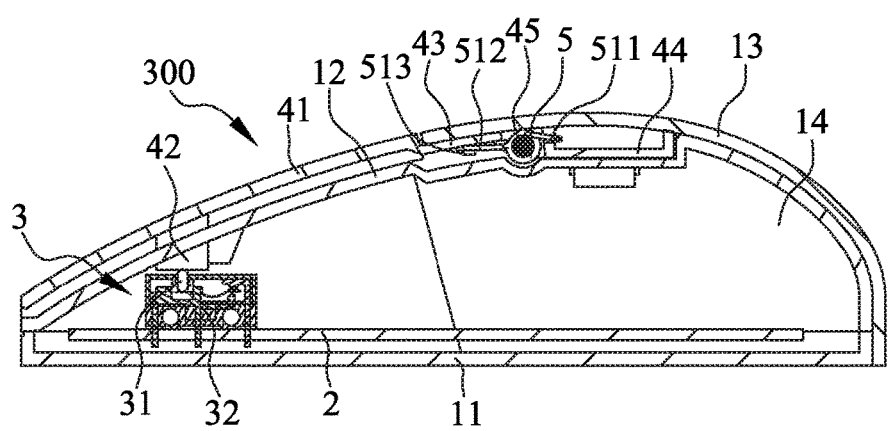
FIG. 9 is a sectional view of the mouse device in accordance with the third preferred embodiment of the present invention.
Figure 10:
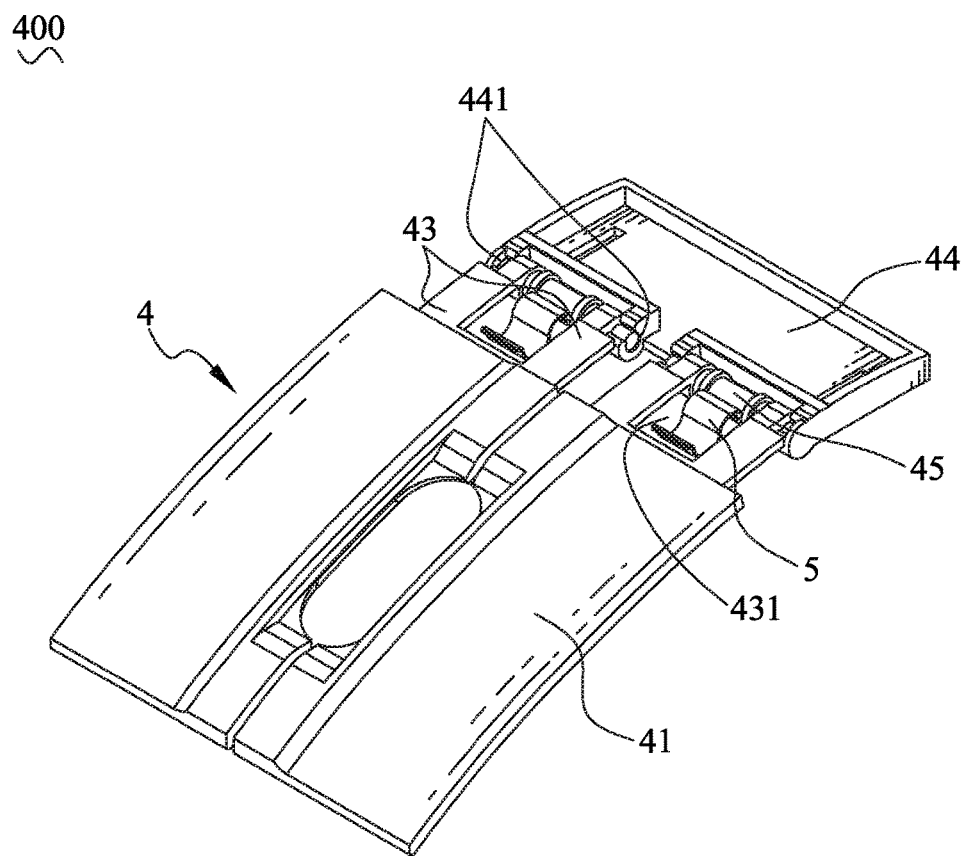
FIG. 10 is a perspective view of a key holder of a mouse device in accordance with a fourth preferred embodiment of the present invention.
Figure 11:
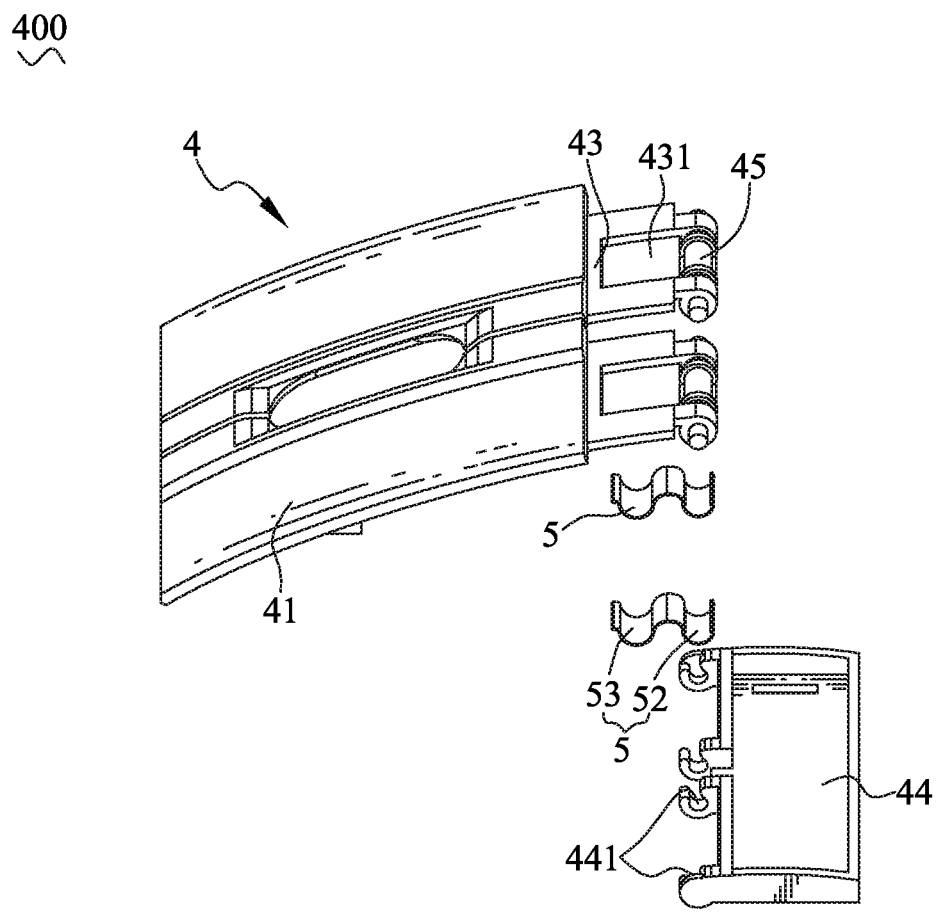
FIG. 11 is an exploded perspective view of the key holder of the mouse device of FIG. 10.
Figure 12:
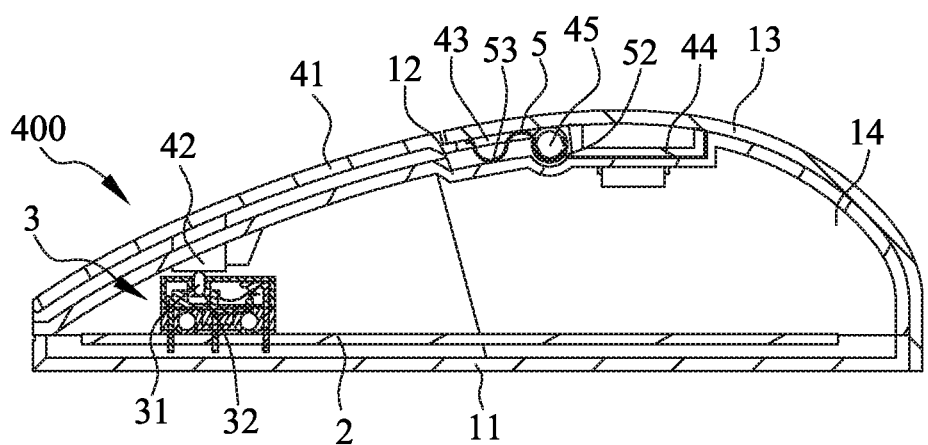
FIG. 12 is a sectional view of the mouse device in accordance with the fourth preferred embodiment of the present invention.

With reference to FIG. 1 to FIG. 3, a mouse device 100 in accordance with a first preferred embodiment of the present invention is shown. The mouse device 100 includes a shell 1, a circuit board 2, at least one electrical switch 3, a key holder 4, at least one elastic element 5 and a roller 6.

The shell 1 includes a bottom shell 11 and a top shell 15. The top shell 15 includes a main shell 12 and a rear cover 13. A top of the shell 1 opens at least one opening 122 communicated with an inside of the shell 1. The bottom shell 11 is acted as a base and is disposed at a bottom of the shell 1. The main shell 12 is of a hollow shape and a bottom of the main shell 12 is opened freely. The main shell 12 is mounted to the bottom shell 11 to form a receiving space 14 between the main shell 12 and the bottom shell 11 of the shell 1. The at least one opening 122 is communicated with the receiving space 14. A middle of a front of a top of the main shell 12 opens a wheel slot 121 communicated with the receiving space 14. A rear of the top of the main shell 12 opens a fastening groove 123 located behind the wheel slot 121 and the at least one opening 122. Specifically, two opposite sides of the front of the top of the main shell 12 open two openings 122 communicated with the receiving space 14 and spaced from each other. The wheel slot 121 is located between the two openings 122. In the first preferred embodiment, the main shell 12 and the rear cover 13 are assembled to form the top shell 15.

The rear cover 13 is covered to a rear end of the main shell 12. The circuit board 2 is assembled in the inside of the shell 1. The circuit board 2 is assembled in the receiving space 14 between the bottom shell 11 and the main shell 12 of the shell 1. The circuit board 2 is defined as a main part for outputting electrical signals of the mouse device 100. The at least one electrical switch 3 is electrically equipped on the circuit board 2 and is corresponding to the at least one opening 122 of the main shell 12 of the shell 1. Specifically, the mouse device 100 includes two electrical switches 3 electrically equipped on the circuit board 2. The two electrical switches 3 are corresponding to the two openings 122, respectively.

The key holder 4 is disposed to the shell 1. The key holder 4 is disposed between the main shell 12 and the rear cover 13 of the shell 1. The key holder 4 includes at least one key 41 and a fastening element 44. The at least one key 41 has a touch element 401 disposed to a front end of the at least one key 41, and a cantilever arm 43. The at least one key 41 is corresponding to the at least one electrical switch 3. The touch element 401 is corresponding to the at least one electrical switch 3. A front end of the key holder 4 has the touch element 401. A bottom surface of the touch element 401 protrudes downward towards the circuit board 2 to form at least one knocking portion 42 corresponding to the at least one electrical switch 3. The touch element 401 of the at least one key 41 is capable of selectively triggering the at least one electrical switch 3 by virtue of the at least one knocking portion 42 of the touch element 401 moving downward to contact or moving upward to break away from the at least one electrical switch 3 through the at least one opening 122.

The at least one knocking portion 42 of the touch element 401 passes through the at least one opening 122 of the main shell 12 to be assembled in the shell 1 and is without being exposed out of the shell 1. A rear end of the touch element 401 extends rearward to form the cantilever arm 43. A free end of the cantilever arm 43 is connected with the fastening element 44. A middle space is surrounded among the touch element 401, the fastening element 44 and the cantilever arm 43. The middle space is defined as an accommodating space 431. The at least one elastic element 5 is fastened to a rear end of the at least one key 41 of the key holder 4 and located to the top shell 15 of the shell 1. The at least one elastic element 5 elastically abuts against at least one of the main shell 12 and the rear cover 13 of the top shell 15 of the shell 1, and the at least one key 41. The at least one elastic element 5 is adjacent to the cantilever arm 43 of the key holder 4. The at least one elastic element 5 is disposed in the accommodating space 431.

Specifically, the key holder 4 includes two keys 41 which are a left key and a right key. Each of the two keys 41 has the touch element 401 and the cantilever arm 43. Each of the two keys 41 is corresponding to one of the two electrical switches 3 to which each of the two keys 41 is corresponding. A bottom surface of each of the two keys 41 extends downward towards the circuit board 2 to form the knocking portion 42. The knocking portions 42 of the two keys 41 pass through the two openings 122 of the main shell 12 to be assembled in the shell 1 and are without being exposed out of the shell 1. A rear end of each of the two keys 41 extends rearward to form the cantilever arm 43. The free end of the cantilever arm 43 is connected with the fastening element 44. The middle space is surrounded between each of the two keys 41 and the fastening element 44. The middle space is defined as the accommodating space 431. The at least one elastic element 5 is disposed to the rear ends of the two keys 41 of the key holder 4 and is adjacent to the cantilever arm 43 of each of the two keys 41. The at least one elastic element 5 is disposed in the accommodating space 431.

Positions of the touch element 401 and the at least one knocking portion 42 of the touch element 401 are all corresponding to a disposition position of the at least one electrical switch 3. The touch element 401 is capable of proceeding moving upward and downward with respect to the shell 1. The at least one knocking portion 42 and the touch element 401 together move, so when a force is exerted on the touch element 401 to make the touch element 401 together with the at least one knocking portion 42 move downward (namely a direction towards the circuit board 2) to a pressing position, the at least one knocking portion 42 of the touch element 401 triggers the at least one electrical switch 3, and when the force is without being exerted on the touch element 401 to make the touch element 401 together with the at least one knocking portion 42 be normally kept in a usual position, the at least one knocking portion 42 and the at least one electrical switch 3 are without forming an electrical trigger relation.

Specifically, the mouse device 100 includes two elastic elements 5 disposed to the rear ends of the two keys 41. Several portions of the rear ends of the touch elements 401 of the two keys 41 extend rearward to form a plurality of the cantilever arms 43 arranged at intervals and located at a substantial middle of the key holder 4. Free ends of the plurality of the cantilever arms 43 are connected with the fastening element 44. The mouse device 100 in accordance with the first preferred embodiment includes four cantilever arms 43. The middle space is surrounded between each of the two keys 41 and the fastening element 44. The middle space is defined as the accommodating space 431. The two elastic elements 5 are disposed to the rear ends of the two keys 41 of the key holder 4 and each of the two elastic elements 5 is located between and adjacent to two cantilever arms 43 of one of the two keys 41. The two elastic elements 5 are extended from the rear ends of the two keys 41 of the key holder 4. Each of the two elastic elements 5 is disposed in the accommodating space 431.

The fastening element 44 is used for being assembled in the fastening groove 123 of the main shell 12 of the shell 1, so that the key holder 4 is fastened to the main shell 12. The roller 6 is disposed in the wheel slot 121 of the main shell 12 of the shell 1, and the roller 6 is capable of pivotally rotating with respect to the shell 1 for outputting a signal, such as a scrolling signal to a computer system to execute a preset function.

Referring to FIG. 1 to FIG. 3 again, the at least one electrical switch 3 includes an electronic switch key 31 and an elastic piece 32. When a user presses downward the touch element 401 of the key holder 4, the at least one knocking portion 42 of the touch element 401 moves downward in advance to contact the electronic switch key 31 of the at least one electrical switch 3, and the at least one knocking portion 42 and the touch element 401 together move downward to the pressing position, at the moment, the electronic switch key 31 vertically contacts the elastic piece 32. When the user releases the touch element 401, because of the force being without being exerted on the touch element 401, the elastic piece 32 generates an upward resilience force to push back the electronic switch key 31, the at least one knocking portion 42 of the touch element 401 and the touch element 401 together to initial positions, so that a pressing action is completed.

Each of the two electrical switches 3 includes the electronic switch key 31 and the elastic piece 32. When the user presses downward each of the two keys 41 of the key holder 4, the knocking portion 42 of each of the two keys 41 of the key holder 4 moves downward in advance to contact the electronic switch key 31 of the one of the two electrical switches 3 to which each of the two keys 41 is corresponding, and the knocking portion 42 and each of the two keys 41 together move downward to the pressing position, at the moment, the electronic switch key 31 vertically contacts the elastic piece 32. When the user releases each of the two keys 41, because of the force being without being exerted on each of the two keys 41, the elastic piece 32 of the one of the two electrical switches 3 to which each of the two keys 41 is corresponding generates the upward resilience force to push back the electronic switch key 31 of the one of the two electrical switches 3 to which each of the two keys 41 is corresponding, the knocking portion 42 of each of the two keys 41 of the key holder 4 and each of the two keys 41 of the key holder 4 to the initial positions, so that the pressing action is completed.

Positions of the two keys 41 and the two knocking portions 42 of the two keys 41 are all corresponding to the disposition positions of the two electrical switches 3, respectively. The two keys 41 are capable of proceeding moving upward and downward with respect to the shell 1. The knocking portion 42 of each of the two keys 41 and each of the two keys 41 together move, so when the force is exerted on each of the two keys 41 to move downward (namely the direction towards the circuit board 2) to the pressing position, the knocking portion 42 of each of the two keys 41 triggers the one of the two electrical switches 3 to which each of the two keys 41 is corresponding. When the force is without being exerted on each of the two keys 41, each of the two keys 41 is normally kept in the usual position, at the moment, the knocking portion 42 of each of the two keys 41 and the one of the two electrical switches 3 to which each of the two keys 41 is corresponding are without forming the electrical trigger relation.

Referring to FIG. 2 and FIG. 3, in the first preferred embodiment, the at least one elastic element 5 is integrally formed in the accommodating space 431, and the at least one elastic element 5 is extended rearward and arched downward from the rear end of the touch element 401. The at least one elastic element 5 is an arc-shaped dented slice. The mouth of the at least one elastic element 5 faces upward. When the mouse device 100 is completed being assembled, a bottom of the at least one elastic element 5 abuts against the main shell 12 of the shell 1 and a top of the at least one elastic element 5 is located under the rear cover 13. The at least one elastic element 5 is capable of being elastically limited between the rear cover 13 and the main shell 12.

After the touch element 401 of the at least one key 41 of the key holder 4 is pressed downward towards the at least one electrical switch 3 of the circuit board 2, the at least one elastic element 5 is capable of increasing needed resilience force of the at least one key 41 of the key holder 4 for making the touch element 401 of the at least one key 41 of the key holder 4 rebound to an original position more quickly. In this way, when the user presses downward the touch element 401 of the key holder 4 to make the touch element 401 move towards the circuit board 2, the touch element 401 of the key holder 4 will move downward to the pressing position on account of the force being exerted on the touch element 401, at the moment, the bottom of the at least one elastic element 5 will keep abutting against the main shell 12 of the shell 1 and accumulating an elastic force. When the user releases the touch element 401, the elastic force accumulated by the at least one elastic element 5 cooperates with the resilience force imparted by the elastic piece 32 of the at least one electrical switch 3 to make the touch element 401 of the key holder 4 rebound to the original position more quickly.

Referring to FIG. 2 and FIG. 3, in the first preferred embodiment, the two elastic elements 5 are integrally formed in the accommodating spaces 431 of the two keys 41 of the key holder 4, and the two elastic elements 5 are extended rearward and arched downward from the rear ends of the two keys 41 of the key holder 4. The two elastic elements 5 are arc-shaped dented slices. The mouth of each of the two elastic elements 5 faces upward. When the mouse device 100 is completed being assembled, the bottoms of the two elastic elements 5 will abut against the main shell 12 of the shell 1. In this way, when the user presses downward each of the two keys 41 of the key holder 4, each of the two keys 41 of the key holder 4 will move downward towards the circuit board 2 to the pressing position on account of the force being exerted on each of the two keys 41, at the moment, the bottom of each of the two elastic elements 5 will keep abutting against the main shell 12 of the shell 1 and accumulating the elastic force. When the user releases each of the two keys 41, the elastic force accumulated by the elastic element 5 of each of the two keys 41 cooperates with the resilience force imparted by the elastic piece 32 of the one of the two electrical switches 3 to which each of the two keys 41 is corresponding to make each of the two keys 41 of the key holder 4 rebound to the original position more quickly.

Referring to FIG. 1 to FIG. 6, a mouse device 200 in accordance with a second preferred embodiment of the present invention is shown. The mouse device 200 in accordance with the second preferred embodiment of the present invention is substantially the same as the mouse device 100 in accordance with the first preferred embodiment of the present invention. A main difference between the mouse device 200 in accordance with the second preferred embodiment of the present invention and the mouse device 100 in accordance with the first preferred embodiment of the present invention is that a cooperation way of the cantilever arm 43 of the at least one key 41, the fastening element 44 and the rotation shaft 45 of the at least one key 41. Specific differences between the mouse device 100 in accordance with the first preferred embodiment of the present invention and the mouse device 200 in accordance with the second preferred embodiment of the present invention are described as follows.

Referring to FIG. 1 to FIG. 6 again, in order to describe conveniently, the roller 6 is omitted to be described. In the second preferred embodiment, the at least one key 41 of the key holder 4 includes the touch element 401, the cantilever arm 43 of a U shape and a rotation shaft 45. The rear end of the touch element 401 extends rearward to form the U-shaped cantilever arm 43. The rotation shaft 45 is connected with two free ends of the U-shaped cantilever arm 43. Two opposite sides of the rotation shaft 45 project beyond two opposite side surfaces of the two free ends of the U-shaped cantilever arm 43. The accommodating space 431 is formed between the U-shaped cantilever arm 43 and the rotation shaft 45. The rotation shaft 45 extends frontward to form the at least one elastic element 5 projecting into the accommodating space 431. The at least one elastic element 5 is arched upward and then arched downward from the rotation shaft 45. The at least one elastic element 5 is a curved elastic piece and of a substantially lying S shape. A front end of the fastening element 44 has at least one clamping slot 441 for clamping and fastening the rotation shaft 45 of the at least one key 41 to make the touch element 401, the cantilever arm 43, the rotation shaft 45 and the fastening element 44 connected to form the complete key holder 4.

The at least one elastic element 5 abuts between an inner surface of the rear cover 13 and the top of the main shell 12. The at least one elastic element 5 abuts upward against the inner surface of the rear cover 13, and abuts downward against the top of the main shell 12. When the user presses downward on the touch element 401 of the at least one key 41, the touch element 401 of the at least one key 41 will move downward and drive the rotation shaft 45 of the at least one key 41 to rotate in an anticlockwise direction to the pressing position on account of the force being exerted on the touch element 401 of the at least one key 41, at the moment, the top and the bottom of the at least one elastic element 5 abut against the rear cover 13 and the main shell 12 of the shell 1, respectively in a rotation movement process of the at least one elastic element 5, the at least one elastic element 5 generates a micro distortion and accumulates the elastic force, and the at least one elastic element 5 keeps imparting a clockwise torsion on the rotation shaft 45 of the at least one key 41. When the user releases the touch element 401 of the at least one key 41, the clockwise torsion of the rotation shaft 45 of the at least one key 41 imparted by the at least one elastic element 5 cooperates with the resilience force imparted by the elastic piece 32 of the at least one electrical switch 3 to increase the needed resilience force of the key holder 4 for making the touch element 401 of the at least one key 41 of the key holder 4 rebound to the original position more quickly.

Specifically, the key holder 4 includes the two keys 41 of which each includes the touch element 401, the cantilever arm 43 of the U shape, the rotation shaft 45 and the fastening element 44. The rear end of each of the two keys 41 extends rearward to form the U-shaped cantilever arm 43. The rotation shaft 45 of each of the two keys 41 is connected with the two free ends of the U-shaped cantilever arm 43. The two opposite sides of the rotation shaft 45 of each of the two keys 41 project beyond two opposite side surfaces of the two free ends of the U-shaped cantilever arm 43. The accommodating space 431 is formed between the rotation shaft 45 and the U-shaped cantilever arm 43 of each of the two keys 41. The two rotation shafts 45 of the two keys 41 extend frontward to form the two elastic elements 5. Each of the two elastic elements 5 projects into the accommodating space 431 of one of the two keys 41. The two elastic elements 5 are arched upward and then arched downward from the two rotation shafts 45 of the two keys 41, respectively. Each of the two elastic elements 5 is the curved elastic piece and of the substantially lying S shape. The front end of the fastening element 44 has a plurality of the clamping slots 441 for clamping and fastening the two rotation shafts 45 of the two keys 41 to make the two touch elements 401, the two cantilever arms 43 and the two rotation shafts 45 of the two keys 41, and the fastening element 44 connected to form the complete key holder 4.

The two elastic elements 5 abut upward against two opposite sides of the inner surface of the rear cover 13, and then abut downward against two opposite sides of the top of the main shell 12. When the user presses downward each of the two keys 41, each of the two keys 41 will move downward and drive the rotation shaft 45 of each of the two keys 41 to rotate in the anticlockwise direction to the pressing position on account of the force being exerted on each of the two keys 41, at the moment, the top and the bottom of the elastic element 5 arched from the rotation shaft 45 of each of the two keys 41 abut against the rear cover 13 and the main shell 12 of the shell 1, respectively in the rotation movement process of the elastic element 5 arched from the rotation shaft 45 of each of the two keys 41, the elastic element 5 arched from the rotation shaft 45 of each of the two keys 41 generates the micro distortion and accumulates the elastic force, and the elastic element 5 arched from the rotation shaft 45 of each of the two keys 41 keeps imparting the clockwise torsion on the rotation shaft 45 of each of the two keys 41. When the user releases each of the two keys 41, the clockwise torsion of the rotation shaft 45 of each of the two keys 41 imparted by the elastic element 5 arched from the rotation shaft 45 of each of the two keys 41 cooperates with the resilience force imparted by the elastic piece 32 of the one of the two electrical switches 3 to which each of the two keys 41 is corresponding to make each of the two keys 41 of the key holder 4 rebound to the original position more quickly.

Referring to FIG. 1 to FIG. 9, a mouse device 300 in accordance with a third preferred embodiment of the present invention is shown. The mouse device 300 in accordance with the third preferred embodiment of the present invention is substantially the same as the mouse device 100 in accordance with the first preferred embodiment of the present invention and the mouse device 200 in accordance with the second preferred embodiment of the present invention. A main difference among the mouse device 300 in accordance with the third preferred embodiment of the present invention, the mouse device 200 in accordance with the second preferred embodiment of the present invention and the mouse device 100 in accordance with the first preferred embodiment of the present invention is that the cooperation way of the cantilever arm 43 of the at least one key 41, the fastening element 44 and the rotation shaft 45 of the at least one key 41. Specific differences among the mouse device 100 in accordance with the first preferred embodiment, the mouse device 200 in accordance with the second preferred embodiment and the mouse device 300 in accordance with the third preferred embodiment of the present invention are described as follows.

Referring to FIG. 1 to FIG. 9 again, in order to describe conveniently, the roller 6 is omitted to be described. In the third preferred embodiment, the key holder 4 includes the at least one key 41 which includes the touch element 401, the cantilever arm 43, and the rotation shaft 45. The rear end of the touch element 401 extends rearward to form the cantilever arm 43. The cantilever arm 43 is a thin board. A rear end of the cantilever arm 43 has a first holding groove 434. Two opposite side walls of the first holding groove 434 open two pivoting holes 432 communicated with the first holding groove 434. The rotation shaft 45 is pivotally assembled in the first holding groove 434 and passes through the two pivoting holes 432. The two opposite sides of the rotation shaft 45 project beyond two opposite side surfaces of the two opposite side walls of the first holding groove 434. The at least one elastic element 5 is a torsion spring surrounding the at least one rotation shaft 45. The front end of the fastening element 44 has a second holding groove 442 for fastening the rotation shaft 45 to make the touch element 401, the cantilever arm 43 and the rotation shaft 45 connected to form the complete key holder 4.

The main shell 12 includes the fastening element 44 assembled in the top of the shell 1. The fastening element 44 is assembled in the fastening groove 123 of the main shell 12 of the shell 1. The at least one elastic element 5 has a first rebounding end 511 extending rearward, and at least one second rebounding end 512 extending frontward and then bent outward away from a middle of the at least one elastic element 5. The first rebounding end 511 is located to the fastening element 44 of the top of the main shell 12 and is located under the rear cover 13 of the shell 1. The at least one second rebounding end 512 is fastened under the cantilever arm 43, and abuts against and is adhered to a bottom of the cantilever arm 43. A bottom of the cantilever arm 43 protrudes downward and then extends inward towards the at least one second rebounding end 512 to form at least one L-shaped fastening portion 513. The at least one second rebounding end 512 hooks the at least one fastening portion 513. Specifically, the at least one elastic element 5 has two second rebounding ends 512. Two sides of the bottom of the cantilever arm 43 protrude downward and then extend inward towards the two second rebounding ends 512 of the at least one elastic element 5 to form two L-shaped fastening portions 513. The two second rebounding ends 512 of the at least one elastic element 5 hook the two fastening portions 513, respectively.

When the user presses downward the touch element 401 of the at least one key 41, the touch element 401 of the at least one key 41 will move downward to the pressing position on account of the force being exerted on the touch element 401 of the at least one key 41, at the moment, the at least one second rebounding end 512 of the at least one elastic element 5 will rotatably move downward together with the cantilever arm 43 and the rotation shaft 45 of the at least one key 41 in the anticlockwise direction, and bring along the first rebounding end 511 to rotatably move upward in the anticlockwise direction to abut against the inner surface of the rear cover 13 of the shell 1, at the moment, the first rebounding end 511 has a downward counterforce. When the user releases the touch element 401 of the at least one key 41, the first rebounding end 511 has the downward counterforce to bring along the at least one elastic element 5, namely the torsion spring to rotate in a clockwise direction to make the at least one second rebounding end 512 generate an upward stress, so that the upward stress is imparted on the cantilever arm 43 of the at least one key 41 and a clockwise torsion is imparted on the rotation shaft 45 of the at least one key 41, and the downward counterforce of the first rebounding end 511 and the upward stress of the at least one second rebounding end 512 cooperate with the resilience force of the elastic piece 32 of the at least one electrical switch 3 to increase the needed resilience force of the key holder 4 for making the key holder 4 rebound to the original position more quickly.

Specifically, the key holder 4 includes the two keys 41 of which each includes the touch element 401, the cantilever arm 43 and the rotation shaft 45. Each of the two keys 41 is extended rearward to form the cantilever arm 43. The cantilever arm 43 of each of the two keys 41 is the thin board. The rear end of the cantilever arm 43 of each of the two keys 41 has the first holding groove 434. Two opposite side walls of the first holding groove 434 of each of the two keys 41 open the two pivoting holes 432 communicated with the first holding groove 434. The rotation shaft 45 of each of the two keys 41 is pivotally assembled in the first holding groove 434 and passes through the two pivoting holes 432. Two opposite sides of the rotation shaft 45 of each of the two keys 41 project beyond two opposite side surfaces of the two opposite side walls of the first holding groove 434. The two elastic elements 5 are the torsion springs surrounding the two rotation shafts 45 of the two keys 41, respectively. The front end of the fastening element 44 has two second holding grooves 442 for fastening the two rotation shafts 45 of the two keys 41 to make the two touch elements 401, the two cantilever arms 43 and the two rotation shafts 45 of the two keys 41 connected to form the complete key holder 4.

Each of the two elastic elements 5 has the first rebounding end 511 extending rearward, and the at least one second rebounding end 512 extending frontward and then bent outward away from the middle of each of the two elastic elements 5. The first rebounding end 511 of each of the two elastic elements 5 is located to the fastening element 44 of the top of the main shell 12 and is located under the rear cover 13 of the shell 1. The at least one second rebounding end 512 of each of the two elastic elements 5 is fastened under the cantilever arm 43 one of the two keys 41, and abuts against and is adhered to the bottom of the cantilever arm 43 of the one of the two keys 41. The bottom of the cantilever arm 43 of each of the two keys 41 protrudes downward and then extends inward towards the at least one second rebounding end 512 of the elastic element 5 disposed to the rear end of each of the two keys 41 to form at least one L-shaped fastening portion 513. The at least one second rebounding end 512 hooks the at least one fastening portion 513. Specifically, each of the two elastic elements 5 has the two second rebounding ends 512. The two sides of the bottom of the cantilever arm 43 of each of the two keys 41 protrude downward and then extend inward towards the two second rebounding ends 512 of each of the two elastic elements 5 to form the two L-shaped fastening portions 513. The two second rebounding ends 512 of each of the two elastic elements 5 hook the two fastening portions 513, respectively.

When the user presses downward the touch element 401 of each of the two keys 41, the touch element 401 of each of the two keys 41 will move downward to the pressing positions on account of the force being exerted on the touch element 401 of each of the two keys 41, at the moment, the at least one second rebounding end 512 of the elastic element 5 disposed to the rear end of each of the two keys 41 will rotatably move downward together with the cantilever arm 43 and the rotation shaft 45 of each of the two keys 41 in the anticlockwise direction, and bring along the first rebounding end 511 of the elastic element 5 disposed to the rear end of each of the two keys 41 to rotatably move upward in the anticlockwise direction to abut against the inner surface of the rear cover 13 of the shell 1, at the moment, the first rebounding end 511 of the elastic element 5 disposed to the rear end of each of the two keys 41 has the downward counterforce.

When the user releases the touch element 401 of each of the two keys 41, the first rebounding end 511 of the elastic element 5 disposed to the rear end of each of the two keys 41 has the downward counterforce to bring along the elastic element 5, namely the torsion spring disposed to the rear end of each of the two keys 41 to rotate in the clockwise direction to make the at least one second rebounding end 512 of the elastic element 5 of each of the two keys 41 generate the upward stress, so that the upward stress is imparted on the cantilever arm 43 of each of the two keys 41 and the clockwise torsion is imparted on the rotation shaft 45 of each of the two keys 41, and the downward counterforce of the first rebounding end 511 of the elastic element 5 disposed to the rear end of each of the two keys 41 and the upward stress of the at least one second rebounding end 512 of the elastic element 5 disposed to the rear end of each of the two keys 41 cooperate with the resilience force of the elastic piece 32 of the one of the two electrical switches 3 to which each of the two keys 41 is corresponding to increase the needed resilience force of the key holder 4 for making each of the two keys 41 of the key holder 4 rebound to the original position more quickly.

Referring to FIG. 1 to FIG. 12, a mouse device 400 in accordance with a fourth preferred embodiment of the present invention is shown. The mouse device 400 is substantially the same as the mouse device 100 in accordance with the first preferred embodiment of the present invention, the mouse device 200 in accordance with the second preferred embodiment of the present invention, and the mouse device 300 in accordance with the third preferred embodiment of the present invention. The at least one key 41 of the key holder 4 in accordance with the fourth preferred embodiment is substantially the same as the at least one key 41 of the key holder 4 in accordance with the second preferred embodiment. In the fourth preferred embodiment, the at least one key 41 of the key holder 4 includes the touch element 401, the cantilever arm 43 of the U shape and the rotation shaft 45. The rear end of the touch element 401 extends rearward to form the U-shaped cantilever arm 43. The rotation shaft 45 is connected with the two free ends of the U-shaped cantilever arm 43. The two opposite sides of the rotation shaft 45 project beyond the two opposite side surfaces of the two free ends of the U-shaped cantilever arm 43. The accommodating space 431 is formed between the U-shaped cantilever arm 43 and the rotation shaft 45.

Specifically, the key holder 4 includes the two keys 41 of which each includes the touch element 401, the cantilever arm 43 of the U shape and the rotation shaft 45. The rear end of each of the two keys 41 extends rearward to form the U-shaped cantilever arm 43. The rotation shaft 45 of each of the two keys 41 is pivotally connected with the two free ends of the U-shaped cantilever arm 43. Two opposite sides of the rotation shaft 45 of each of the two keys 41 project beyond the two opposite side surfaces of the two free ends of the U-shaped cantilever arm 43. The accommodating space 431 is formed between the rotation shaft 45 and the U-shaped cantilever arm 43.

A main difference among mouse device 400 in accordance with the fourth preferred embodiment of the present invention, the mouse device 300 in accordance with the third preferred embodiment of the present invention, the mouse device 200 in accordance with the second preferred embodiment of the present invention and the mouse device 100 in accordance with the first preferred embodiment of the present invention is that the cooperation way of the cantilever arm 43 of the at least one key 41, the fastening element 44 and the rotation shaft 45 of the at least one key 41. Specific differences among the mouse device 100 in accordance with the first preferred embodiment, the mouse device 200 in accordance with the second preferred embodiment, the mouse device 300 in accordance with the third preferred embodiment and the mouse device 400 in accordance with the fourth preferred embodiment of the present invention are described as follows.

Referring to FIG. 1 to FIG. 12 again, in order to describe conveniently, the roller 6 is omitted to be described. The at least one elastic element 5 is received in the accommodating space 431. The at least one elastic element 5 is a substantially W-shaped elastic piece. The at least one elastic element 5 has a fastening portion 52 and a resilient portion 53. A rear end of the at least one elastic element 5 is defined as the fastening portion 52, and a front end of the at least one elastic element 5 is defined as the resilient portion 53. The fastening portion 52 of the at least one elastic element 5 is assembled to the rotation shaft 45. The resilient portion 53 of the at least one elastic element 5 is received in the accommodating space 431 and abuts against the top of the main shell 12. A top and a bottom of the resilient portion 53 are capable of abutting against the inner surface of the rear cover 13 and the top of the main shell 12, respectively. The front end of the fastening element 44 has at least one clamping slot 441 for clamping and fastening the rotation shaft 45 of the at least one key 41 to make the touch element 401, the cantilever arm 43, the rotation shaft 45 and the fastening element 44 connected to form the complete key holder 4.

When the user presses downward the touch element 401 of the at least one key 41, the touch element 401 of the at least one key 41 will move downward to the pressing position on account of the force being exerted on the touch element 401 of the at least one key 41, at the moment, the fastening portion 52 of the at least one elastic element 5 and the rotation shaft 45 together rotate in the anticlockwise direction, the bottom of the resilient portion 53 of the at least one elastic element 5 will keep abutting against the top of the main shell 12 of the shell 1 to generate the micro distortion and accumulate the elastic force, the clockwise torsion is imparted on the fastening portion 52 of the at least one elastic element 5 and the rotation shaft 45 of the at least one key 41. The upward counterforce is kept being imparted on the touch element 401 of the at least one key 41. When the user releases the touch element 401, the upward counterforce imparted by the at least one elastic element 5 cooperates with the resilience force of the elastic piece 32 of the at least one electrical switch 3 to make the touch element 401 of the at least one key 41 of the key holder 4 rebound to the original position more quickly.

Specifically, each of the two elastic elements 5 is received in the accommodating space 431. Each of the two elastic elements 5 is the substantially W-shaped elastic piece. Each of the two elastic elements 5 has the fastening portion 52 and the resilient portion 53. A rear end of each of the two elastic elements 5 is defined as the fastening portion 52, and a front end of each of the two elastic elements 5 is defined as the resilient portion 53. The fastening portion 52 of the elastic element 5 disposed to the rear end of each of the two keys 41 is assembled to the rotation shaft 45 of the one of the two keys 41. The resilient portion 53 of the rotation shaft 45 of the one of the two keys 41 is received in the accommodating space 431 and abuts against the top of the main shell 12. The front end of the fastening element 44 has the plurality of clamping slots 441 for clamping and fastening the two rotation shafts 45 of the two keys 41 to make the two touch elements 401, the two cantilever arms 43 and the two rotation shafts 45 of the two keys 41 and the fastening element 44 connected to form the complete key holder 4.

When the user presses downward each of the two keys 41, each of the two keys 41 will move downward to the pressing position on account of the force being exerted on each of the two keys 41, at the moment, the fastening portion 52 of the elastic element 5 disposed to the rear end of each of the two keys 41 rotate together with the rotation shaft 45 of each of the two keys 41 in the anticlockwise direction, the bottom of the resilient portion 53 of the elastic element 5 disposed to the rear end of each of the two keys 41 will keep abutting against the top of the main shell 12 of the shell 1 to generate the micro distortion and accumulate the elastic force, the clockwise torsion is imparted on the fastening portion 52 of the elastic element 5 disposed to the rear end of each of the two keys 41 and the rotation shaft 45 of each of the two keys 41. The upward counterforce is kept being imparted on each of the two keys 41. When the user releases each of the two keys 41, the upward counterforce imparted by the elastic element 5 disposed to the rear end of each of the two keys 41 cooperates with the resilience force of the elastic piece 32 of the one of the two electrical switches 3 to which each of the two keys 41 is corresponding to increase the needed resilience force of the key holder 4 for making each of the two keys 41 of the key holder 4 rebound to the original position more quickly.

As described above, when the key holder 4 rebounds, the at least one elastic element 5 disposed to each of the mouse device 100 in accordance with the first preferred embodiment, the mouse device 200 in accordance with the second preferred embodiment, the mouse device 300 in accordance with the third preferred embodiment and the mouse device 400 in accordance with the fourth preferred embodiment increases the needed resilience force of the key holder 4, so needed time of the key holder 4 rebounding is decreased for making the key holder 4 rebound to the original position more quickly. As a result, each of the mouse device 100 in accordance with the first preferred embodiment, the mouse device 200 in accordance with the second preferred embodiment, the mouse device 300 in accordance with the third preferred embodiment and the mouse device 400 in accordance with the fourth preferred embodiment is capable of reinforcing a resilience sensitivity of the key holder 4 of each of the mouse device 100 in accordance with the first preferred embodiment, the mouse device 200 in accordance with the second preferred embodiment, the mouse device 300 in accordance with the third preferred embodiment and the mouse device 400 in accordance with the fourth preferred embodiment.

What is claimed is:

1. A mouse device, comprising:
   a shell including a top shell;
   a circuit board assembled in the shell for outputting electrical signals;
   at least one electrical switch electrically equipped on the circuit board;
   a key holder disposed to the shell, the key holder including at least one key corresponding to the at least one electrical switch, the at least one key having a touch element disposed to a front end of the at least one key, the touch element being corresponding to the at least one electrical switch, the at least one key being capable of selectively triggering the at least one electrical switch by virtue of the touch element moving downward to contact and moving upward to break away from the at least one electrical switch; and
   at least one elastic element fastened to a rear end of the at least one key of the key holder and located to the top shell of the shell, the at least one elastic element elastically abutting against at least one of the top shell of the shell and the at least one key, after the touch element of the at least one key of the key holder is pressed downward towards the at least one electrical switch of the circuit board, the at least one elastic element being capable of increasing needed resilience force of the at least one key of the key holder for making the touch element of the at least one key of the key holder rebound to an original position.

2. The mouse device as claimed in claim 1, wherein the shell further includes a bottom shell acted as a base and disposed at a bottom of the shell, the top shell includes a main shell and a rear cover, the main shell is mounted to the bottom shell to form a receiving space between the main shell and the bottom shell, the rear cover is covered to a rear end of the main shell, a middle of a front of a top of the main shell opens a wheel slot communicated with the receiving space, the mouse device further includes a roller disposed in the wheel slot.

3. The mouse device as claimed in claim 2, wherein the key holder includes a fastening element, and two keys which are a left key and a right key, each of the two keys has the touch element and a cantilever arm, a bottom surface of each of the two keys extends downward towards the circuit board to form a knocking portion, a rear of the top of the main shell opens a fastening groove, several portions of rear ends of the touch elements of the two keys extend rearward to form a plurality of the cantilever arms, free ends of the plurality of the cantilever arms are connected with the fastening element, the fastening element is assembled in the fastening groove.

4. The mouse device as claimed in claim 3, wherein a middle space is surrounded between each of the two keys and the fastening element, the middle space is defined as an accommodating space, the mouse device further includes two elastic elements extended from the rear ends of the two keys, each of the two elastic elements is disposed in the accommodating space, the two elastic elements are arc-shaped dented slices, the mouth of each of the two elastic elements faces upward.

5. The mouse device as claimed in claim 2, wherein the key holder includes a fastening element, and two keys which are a left key and a right key, each of the two keys has the touch element, a cantilever arm and a rotation shaft, a bottom surface of each of the two keys extends downward towards the circuit board to form a knocking portion, the rear end of each of the two keys extends rearward to form the U-shaped cantilever arm, the rotation shaft is connected with two free ends of the U-shaped cantilever arm, an accommodating space is formed between the rotation shaft and the U-shaped cantilever arm, the two rotation shafts of the two keys extend frontward to form two elastic elements, each of the two elastic elements projects into the accommodating space.

6. The mouse device as claimed in claim 5, wherein the two elastic elements are arched upward and then arched downward from the two rotation shafts of the two keys, respectively, the two elastic elements abut upward against an inner surface of the rear cover, and then abut downward against the top of the main shell, each of the two elastic elements is a curved elastic piece and of a substantially lying S shape, a front end of the fastening element has a plurality of the clamping slots for clamping and fastening the two rotation shafts of the two keys to make the two touch elements, the two cantilever arms and the two rotation shafts of the two keys, and the fastening element connected to form the complete key holder.

7. The mouse device as claimed in claim 2, wherein the key holder includes two keys which are a left key and a right key, each of the two keys includes the touch element, a cantilever arm and a rotation shaft, a bottom surface of each of the two keys extends downward towards the circuit board to form a knocking portion, each of the two keys is extended rearward to form the cantilever arm, the cantilever arm is a thin board, a rear end of the cantilever arm has a first holding groove, the rotation shaft is pivotally assembled in the first holding groove, a front end of the fastening element has two second holding grooves for fastening the two rotation shafts of the two keys to make the two touch elements, the two cantilever arms and the two rotation shafts of the two keys connected to form the complete key holder.

8. The mouse device as claimed in claim 7, wherein the mouse device includes two elastic elements which are torsion springs surrounding the two rotation shafts of the two keys, respectively, each of the two elastic elements has a first rebounding end extending rearward, and at least one second rebounding end extending frontward and then bent outward away from a middle of each of the two elastic elements, the first rebounding end is located to the top of the main shell and is located under the rear cover, the at least one second rebounding end is fastened under the cantilever arm, and abuts against and is adhered to a bottom of the cantilever arm.

9. The mouse device as claimed in claim 2, wherein the key holder includes two keys of which each includes the touch element, a cantilever arm of a U shape and a rotation shaft, the rear end of each of the two keys extends rearward to form the U-shaped cantilever arm, the rotation shaft is connected with two free ends of the U-shaped cantilever arm, an accommodating space is formed between the rotation shaft and the U-shaped cantilever arm, the mouse device further includes two elastic elements, each of the two elastic elements is received in the accommodating space and is a substantially W-shaped elastic piece, each of the two elastic elements has a fastening portion disposed to the rear end of each of the two keys, and a resilient portion received in the accommodating space and abuts against the top of the main shell.

10. A mouse device, comprising:
a shell including a main shell, and a rear cover covered to a rear end of the main shell, a top of the shell opening at least one opening communicated with an inside of the shell;
a circuit board assembled in the inside of the shell, the circuit board being defined as a main part for outputting electrical signals of the mouse device;
at least one electrical switch electrically equipped on the circuit board and being corresponding to the at least one opening of the shell;
a key holder disposed to the shell and disposed between the main shell and the rear cover of the shell, the key holder including at least one key, the at least one key has a touch element, a bottom surface of the touch element protruding downward towards the circuit board to form at least one knocking portion corresponding to the at least one electrical switch, the at least one key being capable of selectively triggering the at least one electrical switch by virtue of the at least one knocking portion moving downward to contact and moving upward to break away from the at least one electrical switch through the at least one opening; and
at least one elastic element fastened to a rear end of the at least one key of the key holder, the at least one elastic element being elastically limited between the rear cover and the main shell, and the at least one elastic element abutting against at least one of the main shell, the rear cover and the at least one key, after the touch element of the at least one key of the key holder is pressed downward towards the circuit board, the at least one elastic element being capable of increasing needed resilience force of the at least one key of the key holder for making the touch element of the at least one key of the key holder rebound to an original position.

11. The mouse device as claimed in claim 10, wherein the key holder further includes a fastening element, the at least one key has a cantilever arm, a rear end of the touch element extends rearward to form the cantilever arm, a free end of the cantilever arm is connected with the fastening element, a middle space is surrounded among the touch element, the fastening element and the cantilever arm, the middle space is defined as an accommodating space, the at least one elastic element is integrally formed in the accommodating space, and the at least one elastic element is extended rearward and arched downward from the rear end of the touch element, the at least one elastic element is an arc-shaped dented slice, the mouth of the at least one elastic element faces upward.

12. The mouse device as claimed in claim 11, wherein a bottom of the at least one elastic element abuts against the main shell of the shell and a top of the at least one elastic element is located under the rear cover.

13. The mouse device as claimed in claim 10, wherein the key holder further includes a fastening element, the at least one key includes the touch element, a cantilever arm of a U shape and a rotation shaft, a rear end of the touch element extends rearward to form the U-shaped cantilever arm, the rotation shaft is connected with two free ends of the U-shaped cantilever arm, an accommodating space is formed between the U-shaped cantilever arm and the rotation shaft, the rotation shaft extends frontward to form the at least one elastic element projecting into the accommodating space, the at least one elastic element is arched upward and then arched downward from the rotation shaft, the at least one elastic element is a curved elastic piece and of a substantially lying S shape, a front end of the fastening element has at least one clamping slot for clamping and fastening the rotation shaft of the at least one key.

14. The mouse device as claimed in claim 13, wherein a top and a bottom of the at least one elastic element abut against the rear cover and the main shell of the shell, respectively.

15. The mouse device as claimed in claim 10, wherein the at least one key includes the touch element, a cantilever arm and a rotation shaft, a rear end of the touch element extends rearward to form the cantilever arm, a rear end of the cantilever arm has a first holding groove, the rotation shaft is assembled in the first holding groove, the main shell includes a fastening element assembled in the top of the shell, a front end of the fastening element has a second holding groove for fastening the rotation shaft, the elastic element is a torsion spring surrounding the rotation shaft, the cantilever arm is a thin board.

16. The mouse device as claimed in claim 15, wherein two opposite side walls of the first holding groove open two pivoting holes communicated with the first holding groove, the rotation shaft passes through the two pivoting holes, two opposite sides of the rotation shaft project beyond two opposite side surfaces of the two opposite side walls of the first holding groove.

17. The mouse device as claimed in claim 15, wherein the at least one elastic element has a first rebounding end extending rearward, and at least one second rebounding end extending frontward and then bent outward away from a middle of the at least one elastic element, the first rebounding end is located to the fastening element of a top of the main shell and is located under the rear cover of the shell, the at least one second rebounding end is fastened under the cantilever arm and abuts against and is adhered to a bottom of the cantilever arm.

18. The mouse device as claimed in claim 17, wherein a bottom of the cantilever arm protrudes downward and then extends inward towards the at least one second rebounding end to form at least one L-shaped fastening portion, the at least one second rebounding end hooks the at least one fastening portion.

19. The mouse device as claimed in claim 10, wherein the key holder further includes a fastening element, the at least one key includes the touch element, a cantilever arm of a U shape and a rotation shaft, a rear end of the touch element extends rearward to form the U-shaped cantilever arm, the rotation shaft is connected with two free ends of the U-shaped cantilever arm, an accommodating space is formed between the U-shaped cantilever arm and the rotation shaft, the at least one elastic element is a substantially W-shaped elastic piece, the at least one elastic element is received in the accommodating space, a front end of the fastening element has at least one clamping slot for clamping and fastening the rotation shaft.

20. The mouse device as claimed in claim 19, wherein the at least one elastic element has a fastening portion and a resilient portion, a rear end of the at least one elastic element is defined as the fastening portion, and a front end of the at least one elastic element is defined as the resilient portion, the fastening portion is assembled to the rotation shaft, the resilient portion is received in the accommodating space and abuts against a top of the main shell, a top and a bottom of the resilient portion are capable of abutting against an inner surface of the rear cover and the top of the main shell, respectively.

\* \* \* \* \*